United States Patent [19]

Tiktin

[11] 4,368,883
[45] Jan. 18, 1983

[54] WEIGHTED EXERCISE GLOVE

[76] Inventor: Gary Tiktin, Apt. 403W, 27500 Bishop Pk. Dr., Willoughby Hills, Ohio 44092

[21] Appl. No.: 240,080

[22] Filed: Mar. 3, 1981

Related U.S. Application Data

[63] Continuation-in-part of Ser. No. 50,544, Jun. 21, 1979, Pat. No. 4,253,660.

[51] Int. Cl.³ .................. A63B 21/18; A63B 23/00
[52] U.S. Cl. .................................. 272/67; 2/162; 2/163; 272/119
[58] Field of Search ............... 272/93, 67, 68, 117, 272/119, DIG. 4, 143; 2/16, 160, 163, 162, 161

[56] References Cited

U.S. PATENT DOCUMENTS

| | | |
|---|---|---|
| 19,814 | 3/1858 | Monestier . |
| 461,744 | 10/1891 | Fanshawe . |
| 1,358,824 | 11/1920 | Burden . |
| 1,670,176 | 5/1928 | Woolery . |
| 2,011,362 | 8/1935 | Hayward .................. 272/67 |
| 2,736,034 | 2/1956 | Fredenhagen et al. ......... 272/67 X |
| 3,180,641 | 4/1965 | Shane ..................... 272/80 |
| 3,298,689 | 1/1967 | Santora ................... 272/67 X |
| 3,408,657 | 11/1968 | Gallagher ................... 2/159 |
| 3,417,840 | 12/1968 | Farnsworth, Jr. ............. 182/8 |
| 3,635,190 | 1/1972 | Araki ..................... 116/120 |
| 3,751,031 | 8/1973 | Yamauchi ................. 272/57 R |
| 3,838,853 | 10/1974 | Fredenhagen ............... 272/67 |
| 4,034,979 | 7/1977 | Wester .................... 273/54 B |
| 4,109,908 | 8/1978 | Pugh et al. ............... 272/119 |
| 4,253,660 | 3/1981 | Tiktin .................... 272/67 |

*Primary Examiner*—Richard C. Pinkham
*Assistant Examiner*—William R. Browne
*Attorney, Agent, or Firm*—David A. Burge Co.

[57] ABSTRACT

A glove is provided with band-type connectors for releasably connecting with a weight at any of a plurality of selected locations about the outer surface of the glove to facilitate resistance exercising of muscles of the forearm, wrist, hand and/or fingers. The weight is preferably carried on a strap. Each of the band-type connectors or bands extends through a separate set of openings formed in the glove and preferably serves to encircle an adjacent portion of the wearer's hand. Each of the bands preferably loops alternatively out of and into the glove to provide at least one external loop portion which can be connected to the strap-carried weight. By this arrangement the glove may be used in a variety of palm-up, palm-down and palm-sideways attitudes with the strap-carried weight attached at any of the selected locations.

9 Claims, 4 Drawing Figures

WEIGHTED EXERCISE GLOVE

CROSS-REFERENCE TO RELATED APPLICATION

The present application is a continuation-in-part of application Ser. No. 50,544 filed June 21, 1979, issued Mar. 3, 1981 as U.S. Pat. No. 4,253,660, entitled WEIGHTED EXERCISE GLOVE, hereinafter referred to as the "Parent Patent," the disclosure of which is incorporated herein by reference.

BACKGROUND OF THE INVENTION

1. Field of the Invention

The present invention relates generally to an exercise appliance and, more particularly, to a glove having band-type connectors looped through the fabric of the glove for releasably connecting a weight at selected locations about the outer surface of the glove to facilitate controlled resistance exercising of the muscles of the forearm, wrist, hand and/or fingers.

2. Prior Art

While gloves of various configurations have been proposed for sporting and/or protective uses, and while some of these gloves have been provided with weights to facilitate their proper use in certain sporting applications, until the advent of the glove of the Parent Patent, gloves had not previously been utilized as a part of a controlled resistance exercise system.

Prior to the development of the glove of the Parent Patent, proposals of various types had been made in efforts to provide controlled resistance exercise systems for muscles of the forearm, wrist, hand and/or fingers; however, such proposals had not provided a capability to selectively apply resistance exercise forces at precisely selected positions along the hand and/or fingers. Prior proposals did not provide a simple and inexpensive, yet highly versatile system for the controlled resistance exercising of muscles of the forearm, wrist, hand and/or fingers.

3. The Glove of the Parent Patent

In accordance with the preferred practice of the invention of the Parent Patent, an exercise appliance was provided which included essentially three components, namely a glove, a weight, and a connection means for selectively coupling the weight to the glove at a plurality of selected locations about the outer surface of the glove. The weight was preferably carried on a strap, whereby the glove could be oriented at any of a wide variety of attitudes relative to the strap-carried weight to permit a full range of controlled resistance exercise forces to be used in developing muscles of the forearm, wrist, hand and/or fingers. The glove was preferably configured to cover the entire hand of the wearer, and was preferably provided with a wrist-encircling strap or other wrist-engaging formation for securely holding the glove in position during use. In preferred practice, both left and right hand gloves were provided, as were strap-carried weights of various sizes.

The connection system utilized to releasably couple the weight to the glove of the Parent Patent preferably took the form of interfitting parts carried on the glove and on the weight. One or more connection formations or parts, typically metal rings sewn to the fabric of the glove, were provided at selected locations about the outer surface of the glove. A matable connection formation or part was carried by the weight or by the weight-supporting strap so that the weight could be coupled to the glove at any one of the selected locations.

SUMMARY OF THE INVENTION

The present invention represents an extension of the development effort which forms the subject of the Parent Patent. The present invention provides an improved exercise appliance including a glove, a weight, and a releasable connection system which enables the weight to be attached to the glove at selected locations about the outer surface of the glove to facilitate resistance exercising of muscles of the forearm, wrist, hand and/or fingers.

The present invention is like that of the Parent Patent in that, in its preferred practice, it utilizes essentially three components, namely a glove, a weight, and a releasable connection system for selectively coupling the weight to the glove at a plurality of selected locations about the outer surface of the glove. The weight is preferably carried on a strap, whereby the glove may be oriented at any of a wide variety of attitudes relative to the strap-carried weight to permit a full range of controlled resistance exercise forces to be used in developing muscles of the forearm, wrist, hand and/or fingers.

The glove preferably covers the entire hand of the wearer, and may be provided with a wrist-encircling strap or other wrist-engaging formation for securely holding the glove in position during use. In preferred practice, both left and right hand gloves are provided, as are strap-carried weights of various sizes.

The improved character of the glove of the present invention resides in the use of band-type connectors which loop through the fabric of the glove to enable the strap-carried weight to be connected to the glove at selected locations. The band-type connectors or bands are preferably arranged to encircle various hand and/or finger portions, whereby resistance exercise forces may be applied directly to an encircled body portion by a band to which the weight is attached. This arrangement not only provides a simpler and less expensive glove construction but also serves to effect a more direct application of resistance force to a body portion selected for exercise.

As will be apparent from the foregoing summary, a general feature of the present invention lies in the provision of an improved exercise appliance including a glove having improved connection features, and a weight which is connectible to the glove at any of a plurality of selected locations to facilitate resistance exercising of muscles of the forearm, wrist, hand and/or fingers.

These and other features and a fuller understanding of the invention may be had by referring to the following detailed description and claims taken in conjunction with the accompanying drawings.

DESCRIPTION OF THE PREFERRED EMBODIMENT

Figure 1:
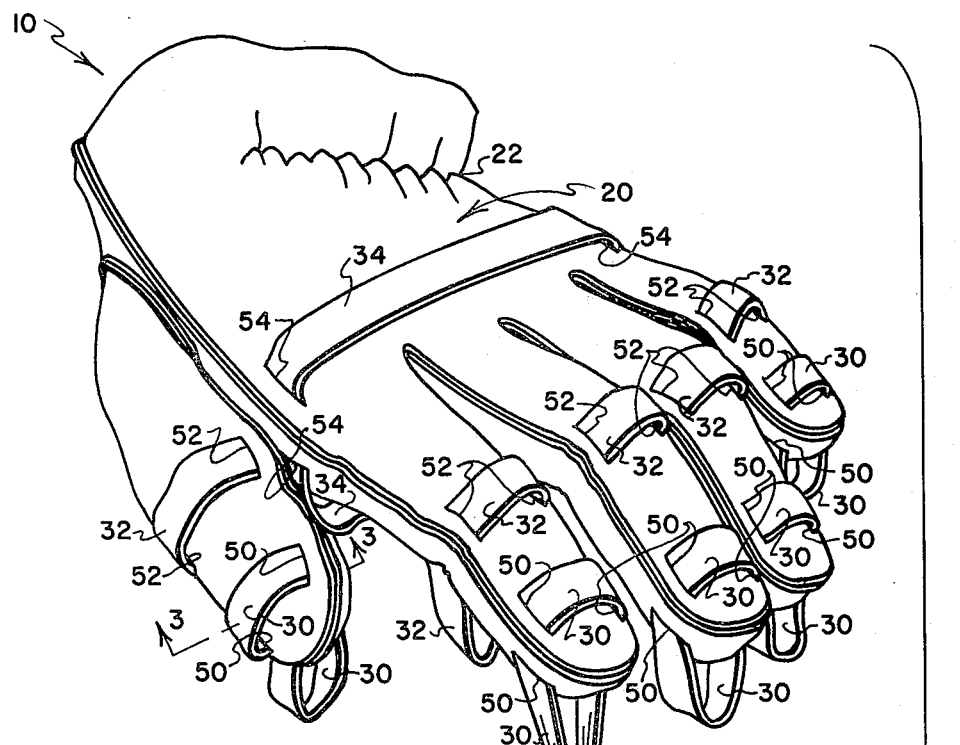
FIG. 1 is a perspective view of a preferred form of exercise appliance incorporating features of the present invention, the appliance including a glove shown in place on a person's hand, and including a strap-carried weight shown supported toward the end of one finger portion of the glove, the strap being foreshortened.
Figure 2:
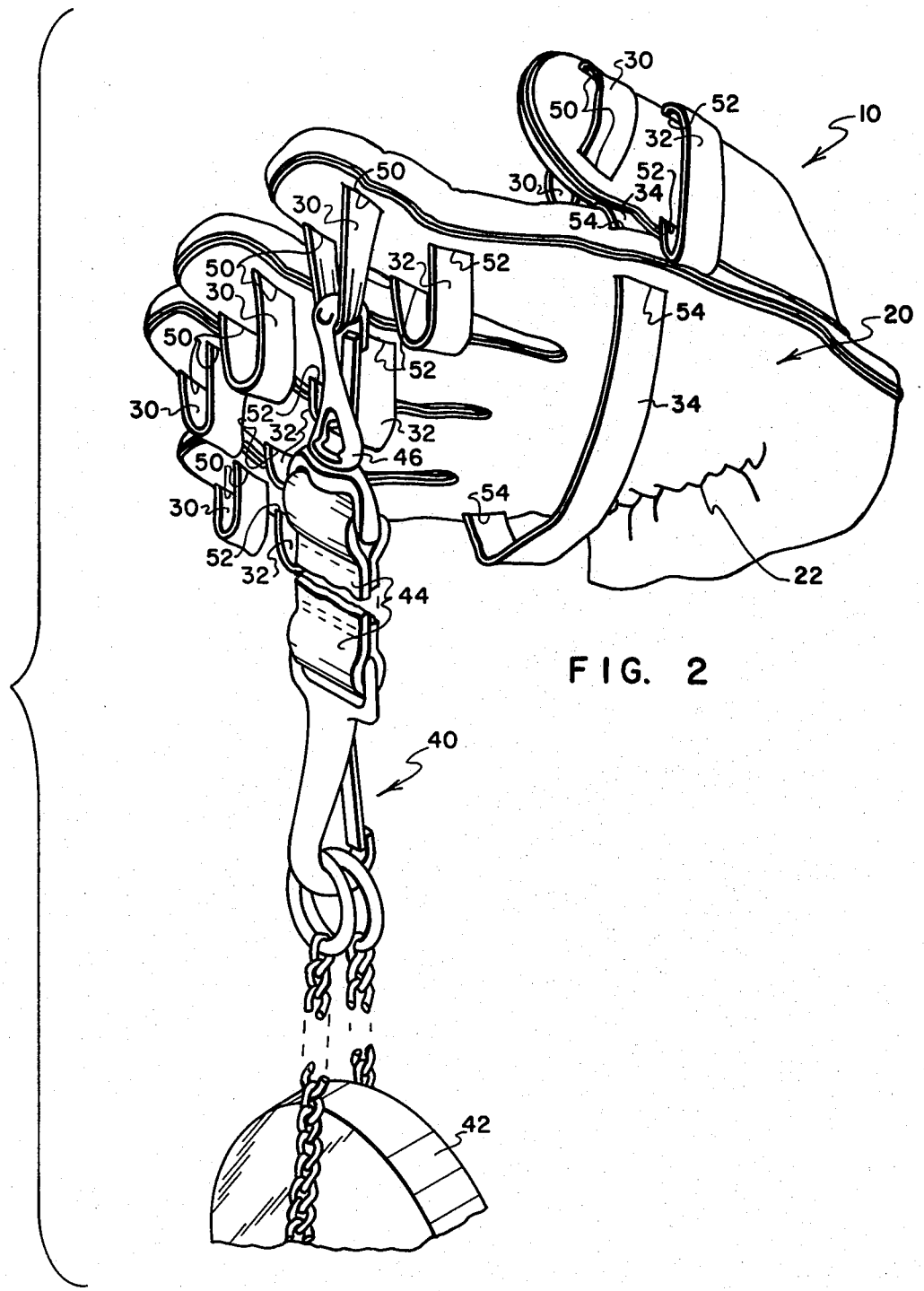
FIG. 2 is a perspective view similar to FIG. 1 with the glove oriented differently to effect an alternate form of exercise.

Referring to FIGS. 1 and 2, an exercise appliance incorporating features of the present invention is indicated generally by the numeral 10. The appliance 10 includes a glove, indicated generally by the numeral 20, and a strap-carried weight, indicated generally by the numeral 40.

The glove 20 is formed from leather or other suitable material which enables it to conform quite closely to the shape of the hand of the wearer and to retain that shape despite the application of forces to various portions of its outer surface. The glove 20 includes an inter-woven wrist strap 22 formed from elastomeric material which encircles the wrist of the wearer and draws the glove 20 into close conformance with the wearer's wrist to hold the glove 20 in place during use. While a left hand glove has been shown in the drawing, it will be understood that, in the preferred practice of the present invention, both left and right hand gloves are provided to facilitate exercising the muscles of both hands.

Band-type fasteners or bands, indicated generally by the numerals 30, 32, 34, extend through pairs of openings 50, 52, 54 provided at various locations on opposite sides of the outer surface of the glove 20 to provide points of attachment where resistance forces can effectively be applied to facilitate a program of controlled resistance exercising of the muscles of forearm, wrist, hand and/or fingers. The bands 30 extend through openings 50 which are located on both upper and lower surfaces of fingertip and thumb tip portions of the glove 20. The bands 32 extend through openings 52 which are located on both upper and lower surfaces of the glove 20 at locations approximately midway along the lengths of the fingers of the glove 20. The bands 34 extend through openings 54 which are located on both the upper and lower surfaces of palm portions of the glove 20. Still other band-type fasteners (not shown) or other fasteners of conventional configuration may also be provided at selected locations about the outer surface of the glove 20.

The weight 40 preferably includes a relatively heavy body 42 supported by a strap 44. A connector 46 is carried by the strap 44 for selectively engaging any of the bands 30, 32, 34 to releasably connect the weight 40 with the glove 20.

The body 42 preferably comprises a commercially available weight of appropriate mass for providing proper resistance exercise forces for a progressive program to improve muscle strength and tone. Weight size can be increased as muscle strength is enhanced. In preferred practice, a number of strap-carried weights 40 of various sizes are used with the glove 20 inasmuch as different muscles have different resistance force exercise capabilities.

Each of the band-type fasteners 30, 32, 34 is formed of a strong, flexible material such as nylon fabric, and takes the form of an endless band. The openings 50, 52, 54 are preferably arranged, (as best seen by the exemplary band 30 shown in FIG. 3) such that each of the bands 30, 32, 34 extends through a total of four of these openings, two of the openings, being located in the upper surface of the glove 20, and two being located in the lower surface of the glove 20. By this arrangement, the bands 30, 32, 34 serve to encircle a hand or finger portion, indicated in FIG. 3 by the numeral 90, and each has upper and lower exposed portions to which the weight strap connector 46 can be coupled.

Figure 3:
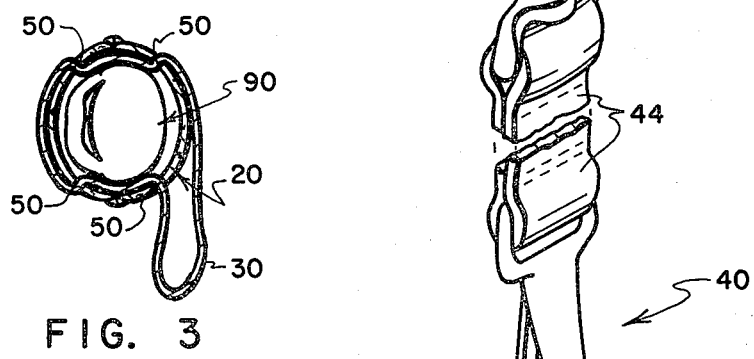
FIG. 3 is a sectional view as seen from a plane indicated by a line 3—3 in FIG. 1; and, FIG. 4 is a sectional view similar to FIG. 3 showing an alternate embodiment.
Figure 4:
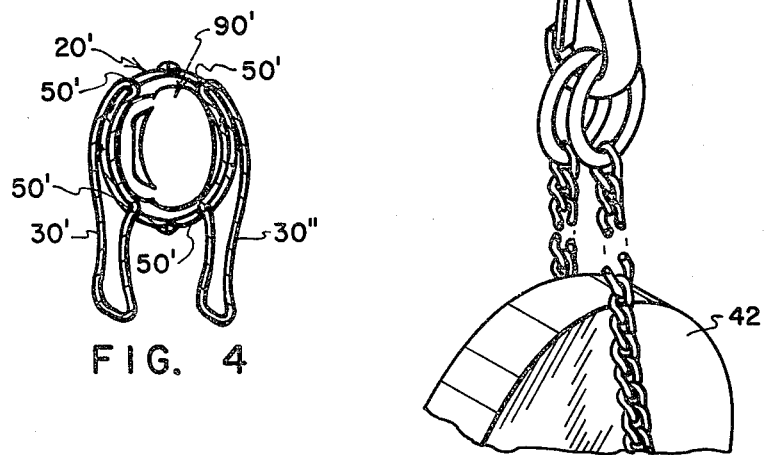

Referring to FIG. 4, an alternate, less-preferred embodiment of the glove 20' utilizes bands 30', 30" which do not encircle adjacent hand or finger portions (as indicated by the numeral 90') but rather simply loop through the fabric of the glove 20'. The body-portion-encircling feature of the bands of the glove embodiment of FIGS. 1–3 is much preferred to the embodiment of FIG. 4 inasmuch as the bands of the preferred embodiment encircle finger or hand portions and thereby permit a very direct and concentrated application of resistance exercise forces at predetermined locations about the hand of the wearer.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. An exercise appliance including a glove, a weight, releasable attaching means for supporting the weight, at least one band-type connection means provided at a selected location on the glove and extending through openings formed in the glove for receiving the releasable attaching means, said releasable attaching means releasably coupling the weight to the glove at the selected location, the weight including a strap and a heavy body, said heavy body being supported on the strap, the releasable attaching means being connected to the strap at a location spaced from the body.

2. The exercise appliance of claim 1 wherein the band-type connection means encircles an adjacent portion of the wearer's hand to permit a direct, concentrated application of weight force by the heavy body to the encircled body portion.

3. The exercise appliance of claim 1 wherein the glove additionally includes wrist-engageable means carried by the glove for grippingly engaging the wrist of the wearer to retain the glove in place on the wearer's hand.

4. The exercise appliance of claim 1 wherein the fastener means is carried on the strap at a location spaced from the body.

5. The exercise appliance of claim 1 wherein the band-type connection means includes an endless band which extends through openings formed on opposite sides of the glove near fingertip portions of the glove.

6. The exercise appliance of claim 1 wherein the band-type connection means includes an endless band which extends through openings formed on opposite sides of the glove near a midpoint along the length of a finger portion of the glove.

7. The exercise appliance of claim 1 wherein the band-type connection means includes an endless strap which extends through openings formed on opposite sides of the glove near a palm portion of the glove.

8. An exercise appliance including:
(a) a glove formed from material which conforms closely to the shape of the hand of a wearer;

(b) connection means including a plurality of endless band-type connector formations carried on the glove at selected positions about the surface of the glove;
(c) a weight;
(d) fastener means connected to the weight and being engageable, one at a time, with the band-type connector formations for releasably coupling the weight to the glove at the selected positions; and,
(e) the weight includes a strap and a heavy body supported on the strap, and the fastener means is carried on the strap at a location spaced from the body, wherein at least one of the band-type connector means extends through an interior portion of the glove alongside an adjacent body portion of the wearer's hand without encircling such adjacent body portion.

9. The exercise appliance of claim 8 wherein at least one of the band-type connectors is arranged to extend through an interior portion of the glove alongside an adjacent body portion of the wearer's hand without encircling such adjacent body portion.

* * * * *